UNITED STATES PATENT OFFICE.

HEINRICH BART, OF LANDAU, GERMANY.

PROCESS OF STERILIZING ANIMAL AND VEGETABLE PRODUCTS.

1,250,079.  Specification of Letters Patent.  Patented Dec. 11, 1917.

No Drawing.  Application filed June 29, 1917. Serial No. 177,835.

*To all whom it may concern:*

Be it known that I, HEINRICH BART, a subject of the German Emperor, and resident of Landau, Rheinpfalz, Germany, have invented certain new and useful Improvements in the Processes of Sterilizing Animal and Vegetable Products, of which the following is a specification.

This invention relates to modifying the properties of micro-organisms and bodies similar to them as regards their functions as ferments, enzyms, etc.

Hitherto no means have been known capable of destroying or reducing the vital functions of micro-organisms and their "tissue-exchange-products", in the manner necessary for the sterilization and preservation of substances liable to decomposition, such as foodstuffs, or for the manufacture of active inoculating substances, without other processes taking place at the same time, which prevent the ideal technical effect from being attained. Thus, for instance, sterilization of foodstuffs, for instance of milk, by boiling, always produces a physiological change, and in the same way, sterilization at ordinary temperature by an addition of bactericidal chemicals, in the quantity required for success, is always combined with undesired effects.

As a means for sterilizing and preserving foodstuffs and the like, it has been suggested to use neutral gases under pressure, for instance air, hydrogen, oxygen, nitrogen, carbonic acid, carbon monoxid, hydrocarbons, protoxid of nitrogen, etc., in the hope that these neutral gases, at pressures of 3–25 atm. destroy all germs without the assistance of any other bactericides; while with the assistance of other bactericides, a pressure of 1 to at the outside 2 atmospheres, would be sufficient for preserving foodstuffs.

Investigations of the applicant have shown that neutral gases at a pressure up to 25 atm. do not have a general bactericidal action. In using various of the above mentioned neutral gases it is possible, even with a pressure considerably above 25 atm., to fail to attain the desired effect. It has been now found that protoxid of nitrogen occupies a special position among all neutral gases; that in using protoxid of nitrogen in certain conditions it is possible to obtain the desired changes in the properties of micro-organisms and their "tissue exchange products", without other effects of an undesirable kind. It has been found that the destruction or reduction of the vital functions of micro-organisms and similar bodies such as ferments, enzyms, etc., in the presence of substances which can be decomposed by bacteria, is very successful if the treatment is carried out in closed vessels with protoxid of nitrogen under a pressure of more than 25 atm. In place of protoxid of nitrogen, substances which generate protoxid of nitrogen can be used, such as for instance hyrate of protoxid of nitrogen, in quantities corresponding to protoxid of nitrogen pressures of over 25 atm. A treatment with other sterilizing means can also be combined with the use of protoxid of nitrogen. Thus, for instance, protoxid of nitrogen and chemically acting means, such as fumigating gases, alcohols, sugars, harmless bactericidal acids, oxygen and substances giving off oxygen, can be used to act on the substance in question either simultaneously or consecutively. The preservatives in question can be of course used in a smaller quantity than that which would be required without the coöperation of protoxid of nitrogen. The present combined process therefore renders it possible to use chemical preservatives in such a small quantity that injurious by-effects no longer appear. The germicidal action of protoxid of nitrogen can also be assisted by a low temperature. The use of a temperature of 0 to 8° C. exercises a favorable effect, but it is preferable to use temperatures below 0° C. Owing to the use of protoxid of nitrogen alone, or with other germicides, on the one hand, and action of cold on the other, it is possible to do even with smaller pressures than 25 atmospheres. In many cases it is even possible to reduce the pressure to 5 atm.

In many cases it has been found advantageous to remove the air from the pressure vessel before introducing the protoxid of nitrogen, more particularly when it is desired to avoid oxidation of the substance to be sterilized or preserved.

The new process can be adapted in many ways to most varied purposes at temperatures below zero to such as are above the maximum temperatures required for the growth of the micro-organisms in question. It can be applied wherever it is desired to stop, or to reduce, micro-organic or similar processes, or to destroy their biological causes.

The discovery of the special efficacy of protoxid of nitrogen used in suitable concentration, is specially surprising in view of the existing literature on the subject. Thus, for instance, Hatton found bacteria in meat juice thrived better in an atmosphere of protoxid of nitrogen than in the air (see *Journal of Chemical Society* 39, 243). Further, Maumene stated that fermentation was accelerated by protoxid of nitrogen (*Travail de Vins*, year 1890, p. 220).

Example 1.

200 parts of a foodstuff or of a medicine, are introduced into a pressure vessel in which a vacuum can be produced. Then it is treated with protoxid of nitrogen of a concentration corresponding to a pressure of over 25 atm., at temperatures below or above 0°, if desired with stirring, all pathogenic and other vegetative forms of micro-organisms being killed. At the same time, growth of blotches, maggots, worms and other living organisms is also completely prevented, as well as development of any spores of micro-organisms. With the reaction temperature above 30°, and with a correspondingly high pressure, it is possible to obtain a quicker sterilization than with a lower temperature.

In order rapidly to destroy spores it is advisable to repeat the above operation several times in such a manner that by allowing the liquid to be sterilized to stand a suitably long time at germination temperature and with reduction of pressure, for instance 24 hours at 15-25°, an opportunity is given to the spores to form vegetative forms. If, on the other hand, it is desired to protect a substance for a longer time from decomposition by bacteria, with simultaneous gradual reduction of the existing micro-organisms, that is to say to preserve it, then protoxid of nitrogen is caused to act at lower temperatures than those used when it is desired to bring about a sterilization, that is to say the quickest possible destruction of the vegetative forms of micro-organisms. In this way it is possible to keep for instance meat for half a year and longer at a cellar temperature, for instance 10°, the nourishing value being retained in a form not injurious to health. The whole contents of the pressure vessel (meat and meat juice) can be used either raw or cooked, as a food of full value.

In the same way other foodstuffs, such as for instance milk, can be sterilized and preserved with protoxid of nitrogen at concentrations corresponding to pressures above 25 atm., in the same conditions, the vital substances, such as for instance ferments, enzyms, immunizing bodies, vitamins and other similar bodies being retained.

In an analogous manner any substance liable to decomposition by bacteria can be sterilized and preserved for instance minced meat, sausage stuffing, organs, organ preparations, glands, serum, organ juices, secretions and similar substances, as well as fruits, seeds, hops, herbs, vegetables, fats, oils, fresh as well as fermenting beer wort, musts and fruit juices, fruits, as well as their extracts and similar substances. Also other substances, for instance silk worm cocoons with larvæ, furs, etc., can be deprived of living larvæ and chrysalis, and preserved.

It has been found further that, by means of protoxid of nitrogen under pressure, it is also possible to produce active inoculating substances or vaccins from bacteria. It is true that the corresponding bacteria are then killed, but the efficacious ingredients contained in the same are not impaired. It has been found that in such cases in certain conditions it is sufficient to have pressures of 10 atm. In this case, instead of protoxid of nitrogen, a substance can be used giving off protoxid of nitrogen, for instance protoxid of nitrogen hydrate.

This discovery is also surprising, as in the work of Kolle & Wassermann, *Handbook der Pathogenum Mikroorganismen*, vol. 3, 1913, p. 492, paragraph 3, as well as in the "*Zeitschrift für Hygiene*," vol. 6, 1889, pp. 19-21, it is denied that protoxid of nitrogen can destroy bacteria.

Example II.

A preparation of bacteria (for instance containing 2 oese in 1 cubic centimeter), to be converted into an inoculating substance or vaccin, in physiological solution of common salt (containing for instance 2 oese in 1 cubic centimeter) is introduced in a bottle provided with a cotton wool pad, into an autoclave in which vacuum is then produced.

The treatment with protoxid of nitrogen at a concentration corresponding to a pressure of 10 atmospheres and beyond, at about 10°, if necessary with stirring, is continued until no virulent or living bacteria are left. That can be easily ascertained by means of the usual bacteriological tests. The concentration of the protoxid of nitrogen, as well as the temperature of the reaction, can be widely varied, according to the resisting force of the micro-organisms used. Obviously the time of reaction must be adjusted accordingly. The chief point is to see that the pressure and the temperature and the time of reaction should be in accordance with the vitality of the bacteria used, even within one and the same species. Thus, the vital functions say of cholera microbes are weakened or destroyed even under less energetic conditions than those required for the typhus microbes.

Analogous is the behavior of gonococci relatively to that of staphylococci, from the point of view of their resistance.

In the same way as in a physiological solution of common salt, micro-organisms for conversion into inoculating substances, could be killed with the assistance of concentrated protoxid of nitrogen in other substances, for instance in peptone solutions.

The injurious micro-organisms in the calf lymph (smallpox) can also be killed, without the smallpox virus being substantially affected.

A further development of the invention consists in the preservation of such foodstuffs as are not assumed to contain living injurious, and more particularly pathogenic, micro-organisms. It is for instance a well known fact that foodstuffs for instance milk that have been pasteurized (that is to say heated for a longer or shorter time to 56–85°, or for a short time to 100°) or biorized (that is to say heated in a finely divided state for a short time to 75° and then quickly cooled) do not keep. The substances decompose in a short time. The reason for the decomposition phenomena to which pasteurized, biorized or in a word boiled milk is liable after a comparatively short time, is the presence of resistant micro-organisms, more particularly of spore builders. Repeated attempts to keep such only partly sterilized foodstuffs, such as milk and the like, without changing their physiological properties, have not led hitherto to any successful results. However it has been found that protoxid of nitrogen or substances generating protoxid of nitrogen, is excellently suited for that purpose, if it is used in concentrations corresponding to pressures of 5 atm. and more. In that way it is possible to preserve say foodstuffs, medicines, vaccins, etc., without causing any injurious by-effects, provided that the substances in question do not contain living injurious, more particularly pathogenic, micro-organisms. The number of the saprophytes contained must also be the smallest possible.

Protoxid of nitrogen could also be mixed with other gaseous bactericides, such as for instance carbonic acid, oxygen, etc., but care must be taken to see that the quantity added, or the corresponding partial pressure of the gases, should not be such as to have an injurious effect on the substances to be preserved. A mixture of protoxid of nitrogen with carbonic acid could be used for instance when the substances to be preserved are comparatively only slightly sensitive to acid action, as is for instance the case with fruit juice, meat, etc. If the substances, such as for instance milk, are sensitive to acids, then it is advisable to dilute protoxid of nitrogen with oxygen. Carbonic acid gas and oxygen gas, when used alone, are unsuitable for sterilization, that is to say for killing vegetative forms of pathogenic micro-organisms, on account of their small bactericidal power; they could be used however mixed with protoxid of nitrogen when they develop considerable bactericidal effect as regards germs, and simultaneously reduce the development of saprophytes, for instance of spore builders.

The other so-called indifferent gases, such as for instance hydrogen, nitrogen, carbon oxid, hydrocarbons, etc., cannot replace the above mentioned gases.

When protoxid of nitrogen is used together with carbonic acid, the process is, on the one hand, more economical, than when protoxid of nitrogen is used alone; on the other hand, injurious by-effects that carbonic acid would exercise when used alone, are considerably reduced, and at the same time the low bactericidal power of carbonic acid is considerably increased by protoxid of nitrogen. The conditions are similar when protoxid of nitrogen and oxygen are used. In this case, in place of carbonic acid and oxygen, other germicides can be used as well such as for instance the chemicals enumerated in the foregoing, low temperatures, and it is also possible to use mixtures of protoxid of nitrogen with carbonic acid, or oxygen, or both, if desired with the coöperation of other germicides, jointly with the action of cold. Also in this case, it is possible to reduce the pressure of the protoxid of nitrogen, if necessary, to 5 atm.

*Example III.*

100 parts of a food substratum either obtained so that it does not contain pathogenic or other injurious bacteria (for instance, milk milked in the most hygienic way) or entirely or partly sterilized by a germ-destroying process or a similar measure (for instance milk and fruit juices, vaccins, etc., pasteurized, biorized or treated first in accordance with Example I), are treated in a pressure vessel in the presence of protoxid of nitrogen concentrations corresponding to pressures of 5 atm. and more, alone or mixed with other germicides, such as for instance carbonic acid or oxygen in concentrations corresponding to total pressures of the mixtures in question of over 5 atm., as well as substances giving off oxygen such as peroxid of hydrogen, benzoic acid, boric acid and other similarly acting substances, in harmless quantities. In this manner it is possible to keep for a very long time, without any injurious changes, milk, fruit juices, etc., which have been biorized and pasteurized.

When a substance preserved in accordance with one of the foregoing processes, is to be used, the gas is either allowed slowly to escape, or, when it is a question of a preserved liquid, for instance milk, the latter is allowed to flow through a narrow opening into a suitable vessel. In this way, the protoxid of nitrogen will escape nearly entirely from the substance preserved, without any special assistance, as owing to its inertness, it does not combine with organic substances, and at an ordinary pressure possesses only a very slight solubility in animal and vegetable substances. Any slight traces of gas that may remain in solution, can be expelled by a short period of heating to say 35-40°, and moderate shaking.

In order to test the physiological action of the greatest quantities of protoxid of nitrogen soluble in the sterilized and preserved substances at atmospheric pressure, experiments were made with young animals 8 days old (guinea pigs and rabbits). For a period of two months they were fed three times daily with milk previously saturated with protoxid of nitrogen at a temperature of 20° and at a barometric pressure of 755-758 mm. During the period of observation, the animals increased in weight in a normal manner, and in no way showed any abnormal behavior, they digested the milk as well as the control animals which were fed in an exactly similar manner with fresh, nontreated milk. After the expiration of the test period, the animals were carefully examined with the assistance of sections which showed everywhere a perfectly normal state. Similarly treated milk was also repeatedly given to babies who enjoyed it without any trouble in digestion.

I claim:

1. A process for altering the properties, that is to say destroying or weakening the vital functions of micro-organisms, ferments, enzyms, and similar bodies, characterized by treating them in the presence of substances decomposable by bacteria, in closed vessels, with protoxid of nitrogen at a pressure exceeding about 5 atmospheres and at a temperature which is below normal when said pressure is substantially below 25 atmospheres.

2. A process for altering the properties, that is to say destroying or weakening the vital functions of micro-organisms, ferments, enzyms, and similar bodies, in which bacterial emulsions are treated, for the purpose of producing active inoculating substances, in closed vessels, with protoxid of nitrogen at pressures of more than about 10 atmospheres and at a temperature of about 10° C.

3. A process in which protoxid of nitrogen is caused to act, in concentrations corresponding to pressures of at least 5 atmospheres and at a temperature which is below normal when said pressure is substantially below 25 atmospheres on vaccins and similar substances which do not contain either pathogenic or other active injurious micro-organisms, for the purpose of weakening the vital functions of the still existing micro-organisms and of their spores and other lasting forms.

4. A process as set forth in claim 4 in which protoxid of nitrogen in admixture with other germicides is caused to act in concentrations corresponding to total pressures of the corresponding mixtures of more than about 5 atmospheres and at a temperature which is below normal when said pressure is substantially below 25 atmospheres.

5. A process as set forth in claims 4 and 5, in which substances, which have been entirely or partly sterilized by a germ-removing process, are preserved by the action of protoxid of nitrogen at pressures of at least 5 atmospheres and at a temperature which is below normal when said pressure is substantially below 25 atmospheres in closed vessels.

6. A process as set forth in claims 1 and 2, in which protoxid of nitrogen mixed with carbonic acid or oxygen is caused to act at a low temperature and at a pressure of at least 5 atmospheres.

7. A process as set forth in claim 4, in which protoxid of nitrogen mixed with carbonic acid or oxygen is caused to act in concentrations corresponding to total pressures of the corresponding mixtures of more than about 5 atmospheres.

8. A process as set forth in claims 4 and 5 in which substances, which have been entirely or partly sterilized by a germ-removing process, are preserved by the action of mixtures of protoxid of nitrogen with other germicides at pressures of at least 5 atmospheres and at a temperature which is below normal when said pressure is substantially below 25 atmospheres in closed vessels.

9. A process of preserving in which substances are first at least partially sterilized with protoxid of nitrogen in accordance with claims 1 and 2, and then preserved by keeping them in contact with nitrogen protoxid at lower pressures than those used in the sterilizing step.

10. A process as set forth in claims 1-10, in which protoxid of nitrogen is formed *in situ* from protoxid of nitrogen generating substances comprising protoxid of nitrogen hydrate, with the condition that the quantity of the substance in question is sufficient to yield the desired pressure of the protoxid of nitrogen for the purpose in question.

11. A process for altering the properties, that is to say destroying or weakening the vital functions of micro-organisms, ferments, enzyms, and similar bodies, which comprises treating them in closed vessels in the presence of substances decomposable by bacteria, with protoxid of nitrogen at a pressure above 25 atmospheres.

12. A process of destroying or weakening the vital functions of micro-organisms or similar bodies such as ferments, enzyms, etc., which comprises subjecting them to protoxid of nitrogen at a high pressure and at a temperature which is below normal when said pressure is substantially below 25 atmospheres.

In testimony whereof I have signed my name to this specification in the presence of two subscribing witnesses.

DR. HEINRICH BART.

Witnesses:
KARL GLÜCK,
FRIEDRICH MINGEZ.